United States Patent [19]

Oliver et al.

[11] 3,795,174

[45] Mar. 5, 1974

[54] MACHINE FOR CUTTING MULTIPLE KEYS

[76] Inventors: Roy N. Oliver, 148 Ellen Dr.; Roy C. Spain, P.O. Box 1668, both of Salem, Va. 24153

[22] Filed: Apr. 6, 1972

[21] Appl. No.: 241,507

[52] U.S. Cl. .................. 90/13.05, 83/581, 144/89
[51] Int. Cl. ............................................. B23c 3/35
[58] Field of Search ...... 90/13.05, 13.05 A; 83/581; 144/85, 89

[56] References Cited
UNITED STATES PATENTS

| | | | |
|---|---|---|---|
| 3,457,832 | 7/1969 | Adler et al. | 90/13.05 |
| 3,469,498 | 9/1969 | Adler et al. | 90/13.05 |
| 3,276,058 | 10/1966 | Harrington et al. | 83/581 X |

FOREIGN PATENTS OR APPLICATIONS

| | | | |
|---|---|---|---|
| 2,471 | 9/1870 | Great Britain | 144/89 |

Primary Examiner—Andrew R. Juhasz
Assistant Examiner—Z. R. Bilinsky

[57] ABSTRACT

A machine for cutting notches or bits in a plurality of keys, or key blanks, at different levels and varying angles to the axes of the keys, the keys being detachably clamped in parallel positions slidably movable with respect to one another by a rocker plate operating upon the tips of the keys whereby a cutting wheel moved transversely across the keys at a predetermined distance from the tips of said keys makes an identical notch in each said key regardless of the angle of desired key notch being cut.

6 Claims, 10 Drawing Figures

MACHINE FOR CUTTING MULTIPLE KEYS

BACKGROUND OF THE INVENTION

Machines for cutting pluralities of keys for cylinder locks simultaneously conventionally make use of cutting wheels which cut notches, or bits, in the key blanks in parallel by passing transversely over the key blanks at right angles to the axis of the blanks; however, problems are encountered when such methods are used for cutting more than one key at a time for cylinder locks such as described and claimed in U.S. Pat. No. 3,499,302 since in the latter notches have to be cut at varying angles with respect to the key axis. Obviously when key blanks are placed in parallel for cutting, if the angle cut across the blanks is other than 90° notches will be cut in all of the keys but one which are improperly located along the key axis.

SUMMARY OF THE INVENTION

The present invention relates to a multiple key cutting machine wherein a series of key blanks in parallel are presented to a cutting wheel, or the like, each of the blanks being positioned automatically in accordance with the angle of cut so that identical keys are produced. This feature is brought about by using a rocker plate coacting with the tip of each key blank wherein each blank is slidably positioned with respect to the angle of cut to be made. Pressure operated means are used for clamping and unclamping the key blanks in order to position the blanks accurately and quickly to have their appropriate notches cut in precise duplication in each key being prepared from a key blank.

DESCRIPTION OF THE DRAWINGS

FIG. 10 is a perspective view of the key blank tab clamping mechanism.

DETAILED DESCRIPTION OF THE INVENTION

Figure 1:
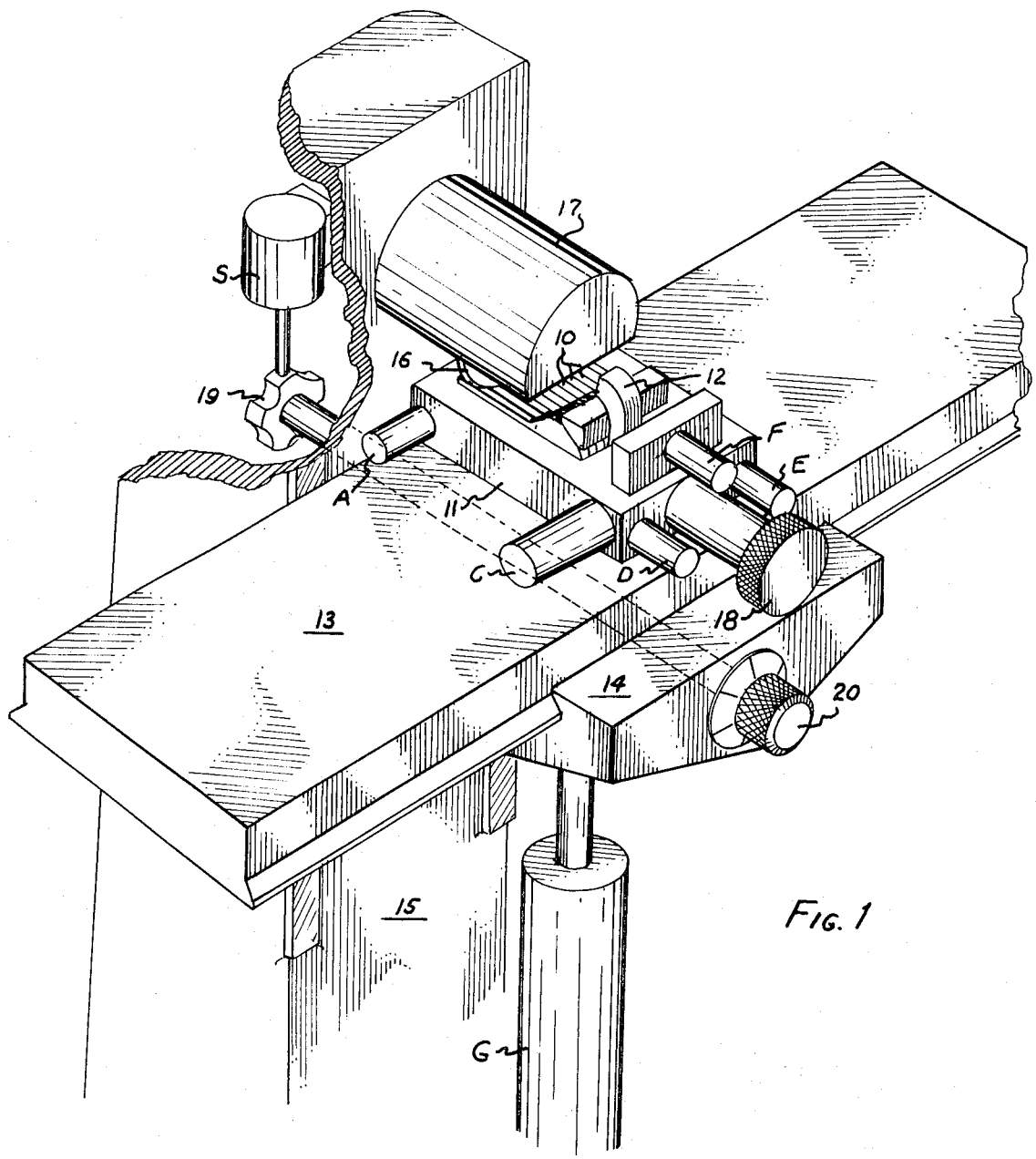
FIG. 1 is a perspective view of the key cutting machine with a portion cut away to show the notch depth servo control.

Reference is made to FIG. 1 which shows overall the present invention. A plurality of key blanks 10 is contained within a fixture 11 being clamped at their tabs by a hinged clamp 12, the tips of the blanks being secured by means detailed further herein. The fixture 11 is supported upon a table 13 slidable upon a base 14, which in turn is vertically slidable upon a column 15 which also supports a fixed drive (not shown) for a cutting wheel 16 having a protective hood 17 attached to column 15. The fixture 11 is also enabled to be turned upon a vertical axis either clockwise or counter clockwise together with control handle 18, which also controls the advance or retarding of the key blanks to and from the cutting wheel 16 as is explained in detail later herein. The base 14 is capable of being raised and lowered, thereby determining the depth of cut of the wheel 16 into the key blanks 10, by a hydraulic cylinder G under control of a servo S according to a setting of a cam 19 which is selectively regulated by a knob 20 to provide a predetermined number of levels (usually six) of notch cuts into the key blanks 10.

In addition to the hydraulic cylinder G there are further hydraulic cylinders A and B (not shown in FIG. 1) for automatically centering the keys 10 after any rotation of the fixture 11 prior to the cutting operation, C for clamping the keys 10 horizontally, D and E for actually turning the keys 10 upon the vertical axis of the fixture 11 prior to the cutting operations, and F for operating the hinged clamp 12, as described later herein. The table 13 is provided with means for reciprocating horizontally of a conventional nature (not shown).

Figure 2:
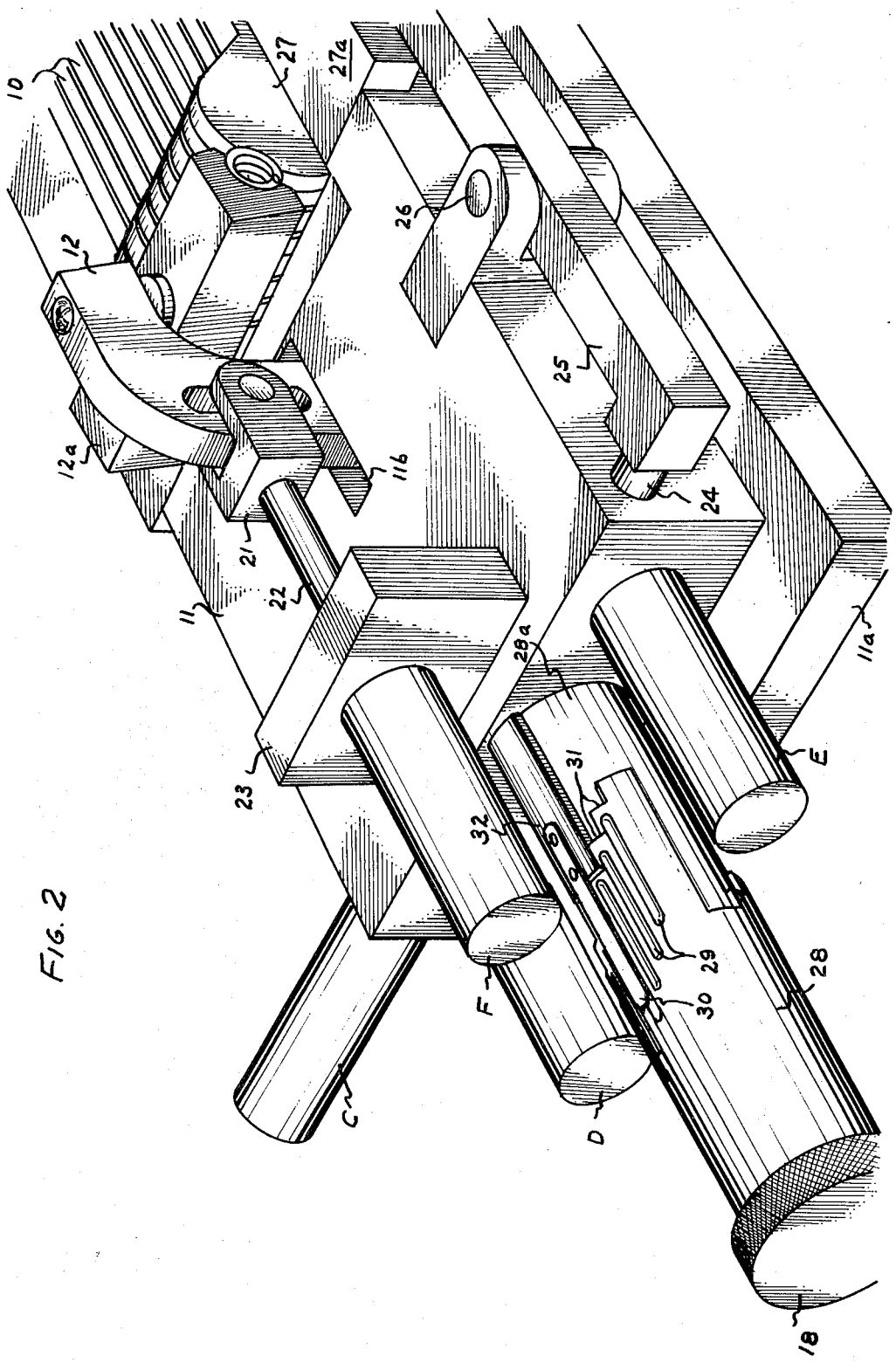
FIG. 2 is a perspective view illustrating the principal clamping means for holding key blanks to be cut.

Referring now to FIG. 2 it is to be noted that the clamp 12 is provided with a swivel member 12a carrying a spring 12b which bears against the tabs 10a of the key blanks, or keys, 10. The clamp 12 has a slotted opening through which a pin fixed in a yoke 21 is arranged to be operated by the cylinder rod 22 of the cylinder F supported by a block 23. This arrangement insures that the rear ends of the key blanks 10 are always firmly held in place. In addition the key blanks 10 are clamped horizontally on each side of the blanks by tab plates 27 (see also FIG. 3) which are held between a fixed block 27b and a movable block 27a by pressure from a tip 25a of a lever 25 pivoted in an extension of the fixture 11 at 26 and coacting with a piston rod 24 which is actuated by the cylinder C.

It is also to be noted at this point that the control handle 18 is mounted upon a hollow tube 29 having upon its lateral surface a series of spaced detentions 29 which cooperate with a detent stop 30 to align a series of raised steps 31 for coacting with a positive stop 32. The knob 18 is manually rotated to present the desired raised step against the stop 32 corresponding to the axial location of a notch to be cut in the key blanks 10, as further described later herein.

Figure 3:
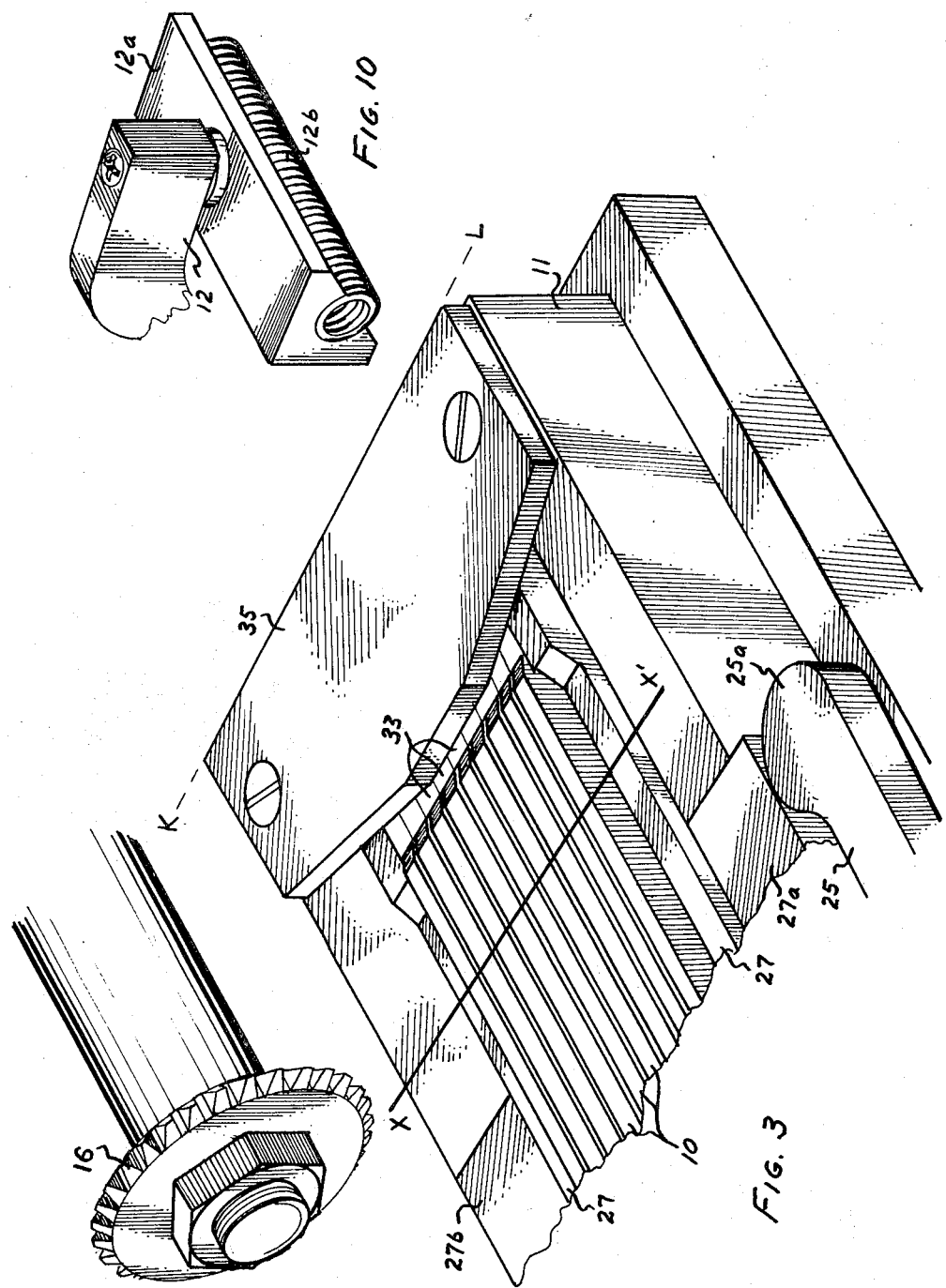
FIG. 3 shows the normal arrangement of key blanks in parallel clamped in place to be cut transversely of the key axis.
Figure 5:
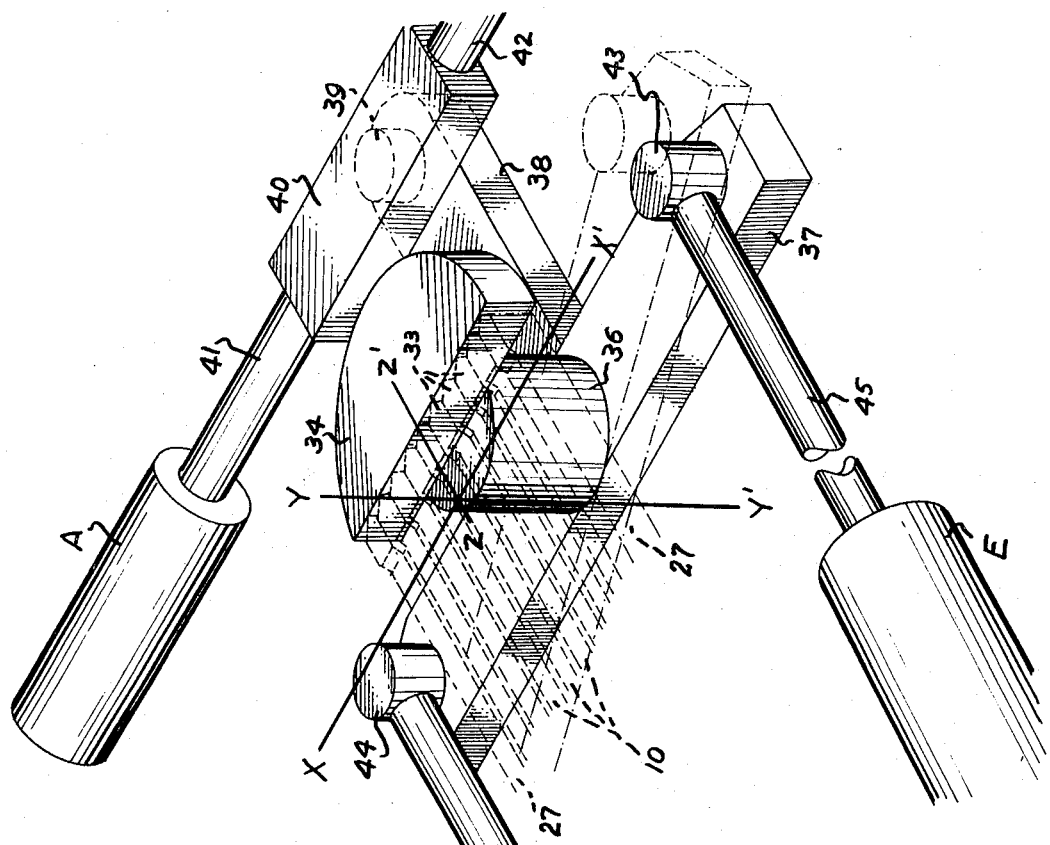
FIGS. 5 and 6 illustrate the action of the rocker plate with respect to the proper alignment of key blanks in parallel for angle cuts, together with the rocker plate operating mechanism.
Figure 6:
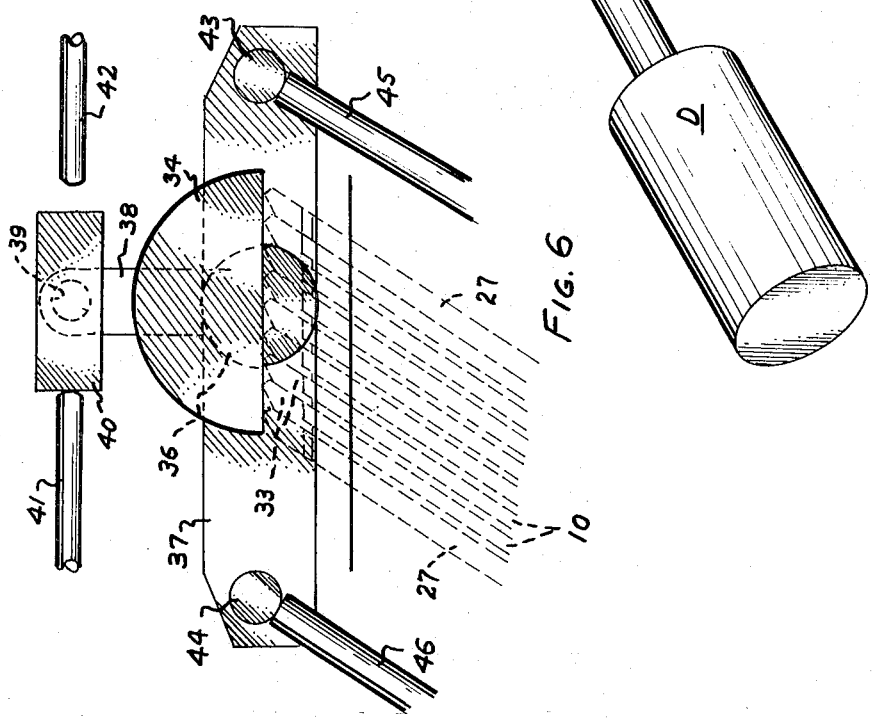
Figure 8:
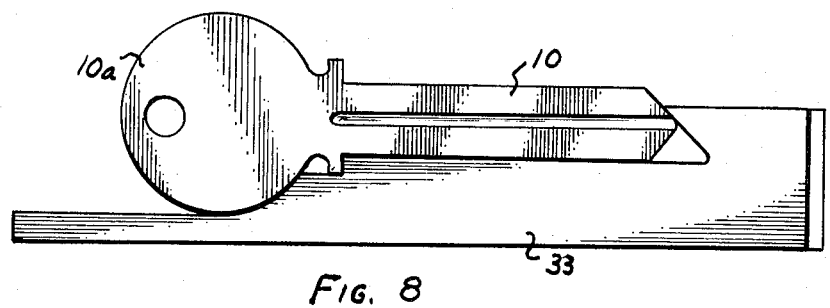
FIG. 8 shows a key blank in position upon the fixture of FIG. 7.
Figure 7:
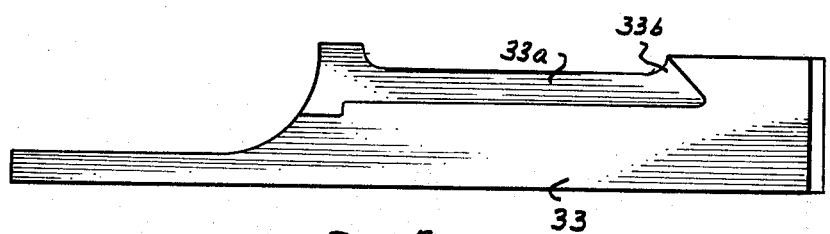
FIG. 7 illustrates the individual key blank fixture.
Figure 9:
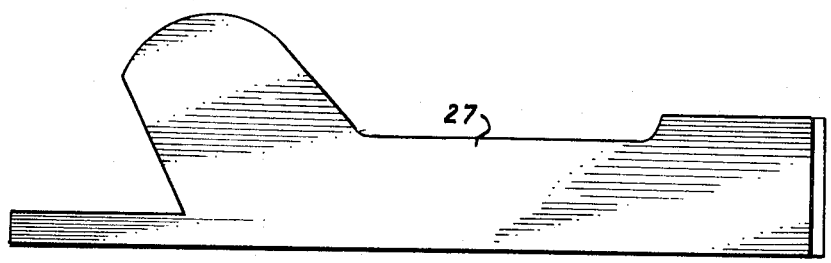
FIG. 9 is a side view of a lateral key blank clamping plate.

Reference is now made momentarily to FIGS. 7, 8 and 9 which illustrate the holding devices for the key blanks 10. For example, the fixture 33 of FIG. 7 is a chisel tipped chamber having a lateral pocket 33a and a key tip pocket 33b into which a key blank 10 (See FIG. 8) is inserted, the tab 10a resting upon the curved portion of the member 33. There is one member 33 for each key blank 10, all of the members 33 being parallel and being clamped together laterally by tab plates 27 on either side of the members 33 and all of the tips of the members 33 bearing against plate 34 as shown in FIG. 5. The plate 34 is rotatable upon a vertical axis 36 within a bearing plate 11a (FIG. 2) in the fixture 11, together with an arm 37 and a bell crank 38 connected with the arm 37. A bearing 39 on the end of bell crank 38 is journalled in a block 40, each end of which is normally held in a predetermined central position by piston rods 41 and 42 respectively coacting with the cylinders A and B respectively whereby the tips of the members 33 all lie in a plane parallel with the edge K-L of a plate 35 (See FIG. 3) which covers the aforesaid plate 34. It is to be noted that the edge K-L is parallel with the line of cutting of the cutter wheel 16 (line X – X') as shown in FIGS. 3, 5 and 6.

Returning to FIG. 5, however, the arm 37 is provided with a bearing knob 43 at one end and a bearing knob 44 at the other end, knobs 43 and 44 respectively coacting with piston rods 45 and 46, which in turn are controlled by cylinders D and E. In other words when the pressure in cylinder E exceeds the pressure in cylinder D the piston rod 45 is extended to push the arm 37 counter clockwise and when the pressure in cylinder D exceeds the pressure in cylinder E the arm 37 is rotated clockwise. However, the cylinders A and B and their piston rods 41 and 42 respectively are so arranged to permit only limited travel of the block 40 whereby the plate 34 can be rotated only 20° in either direction. Consequently, when either of the rods 45 or 46 is extended the plate 34 will be turned only 20° to position it parallel to the cutting line, as shown in FIG. 6 for a counter clockwise rotation wherein the block 40 is separated from the rod 42 under the thrust of rod 45 of cylinder E.

It is to be noted, however, as in FIG. 6 that the members 33 being confined by the plate 34 at their tips and by the clamp 12 at their tabs 10a are slid along each other by the rotation of plate 34 provided that the clamping action of cylinder C is relieved whereby lever 25 releases the clamping of the tab plates 27 momentarily. As a result the action of the cutting wheel 16 across the key blanks is at an angle of 20° degrees or an angle equal to the rotation of the plate 34. The cut will also be identical in each key blank with respect to its distance from the tip of the blank.

Figure 4:
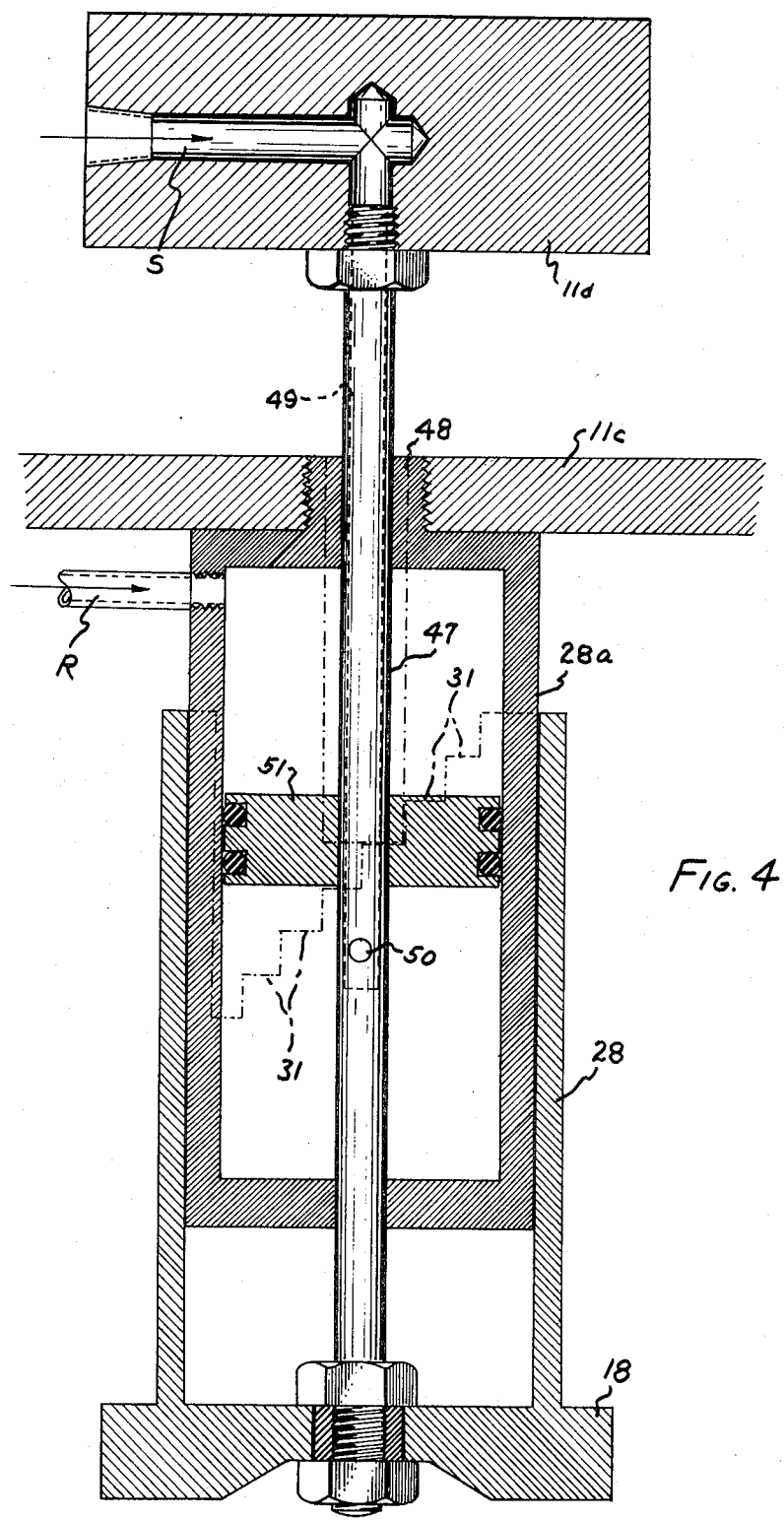
FIG. 4 is a cross-sectional view of the indexing mechanism for locating notches to be cut along the key axis and also illustrates the construction of the indexing mechanism.

Reference is now made to FIG. 4 showing in more detail the control handle 18 and the tube 28 of FIG. 2. In essence the handle 18 (shown in FIG. 4 without its knurled cap) provides a means of indexing the axial notches to be cut into the key blanks 10 through its raised steps 31 coacting with the stop 32 (FIG. 2). The handle 18 is an integral part of the tube 28 which acts as a sleeve over another tube or cylinder 28a attached to a portion 11c of the fixture 11. A hollow piston rod 47 is attached at one end to the handle 18 and at the other end to a portion 11d which provides a bearing for the axle 36 (See FIG. 5). Within the hollow piston rod 47, which is supported in the fixture portion 11c by a bearing 48, is a tube 49 having an outlet 50. Air under pressure is introduced to the tube 49 via an orifice S to the bottom side of a piston 51 (See FIG. 4) through the tube 49 and its outlet 50 thereby forcing the steps 31 of the tube or sleeve 28 against the stop 32 (See FIG. 2). When the handle 18 is rotated therefore, the keys or key blanks 10 are moved along the axis Z – Z' to present successive axial notch cutting positions to the cutting wheel 16. When the notches have all been cut in the key blanks 10 as desired air is introduced into an orifice R at greater pressure to return the piston (downward as shown in FIG. 4) to its original position.

In order to preserve alignment of the tube 28 with the cylinder 28a duplicate steps 31 and detentions 29 are provided on each side of the tube 28 (180° apart), together with an additional detent stop 30 and positive stop 32.

The process of cutting keys with the subject machine consists therefore of placing key blanks 10 in the members 33, (See FIG. 8) providing pressure to the cylinder C to clamp the blanks 10 laterally between the tab plates 27 (FIGS. 2 and 3), providing pressure to the cylinder F to clamp the blanks between the tip pockets 33b in the members 33 and the hinged clamp 12, the members 33 in turn being projected against the plate 34, applying pressure to both cylinders A and B (FIG. 1) to insure that the plate 34 is centered (for notch cuts by wheel 16 at right angles to the axes of the blanks 10), selecting the depth of cut by the knob 20 and the axial position of each notch by the handle 18. Whenever an angular notch is desired to be cut, however, pressure has to be applied to either cylinder D or E to rotate the plate 34 while the pressure on cylinder C is momentarily relieved. Thereafter cylinders A and B are activated to position the member 37 parallel to the cutting line x–x'. In any event each cutting of a notch in the key blanks is along the X – X' axis and the bottom of each notch that is cut is defined by the Y – Y' axis.

What is claimed is:

1. A machine for cutting a plurality of identical keys comprising means for holding a quantity of key blanks in parallel alignment with one another, supporting means for said holding means, a notch cutting wheel under which said blanks are passed to be notched, means for regulating the distance between said blanks and said wheel to determine the depth of notches to be cut, indexing means for positioning said blanks axially for locating notches therein, said holding means normally permitting notches to be cut by said wheel in said blanks at right angles to their axes, means to release momentarily said holding means to allow said blanks to be slidably positioned, and means for displacing said blanks laterally and axially with respect to each other during said release to permit notches to be cut therein at acute angles whereby said notches are identical in angle and axial location for each blank.

2. The invention of claim 1 wherein said holding means includes elements having pockets coacting with the tips of said blanks and a common pivoted, resilient clamp coacting with the tabs of said blanks between which said blanks are held.

3. The invention of claim 1 wherein the said indexing means includes a stepping control actuated manually for each potential notch position and pressure means for retaining said control against deviation at each step location.

4. The invention of claim 1 further including means for returning said blanks to their original axial alignment upon a further action of said releasing means.

5. The invention of claim 2 wherein said displacing means is a rotatable plate coacting with the ends of said elements to change their normal alignment corresponding to the extent of rotation of said plate.

6. The invention of claim 5 with the further provision of limiting means for the rotation of said plate according to the acute angle of the notch to be cut.

* * * * *